Jan. 29, 1957 M. L. TUCKER 2,779,443
AUTOMATIC BRAKING TRAILER HITCH
Filed Feb. 11, 1955 2 Sheets-Sheet 1

Maurice L. Tucker
INVENTOR.

BY *Clarence A. O'Brien*
and *Harvey B. Jacobson*
Attorneys

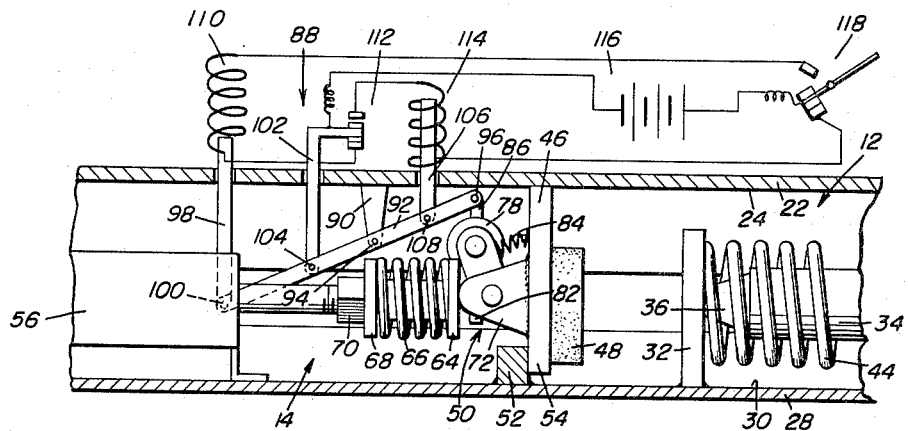
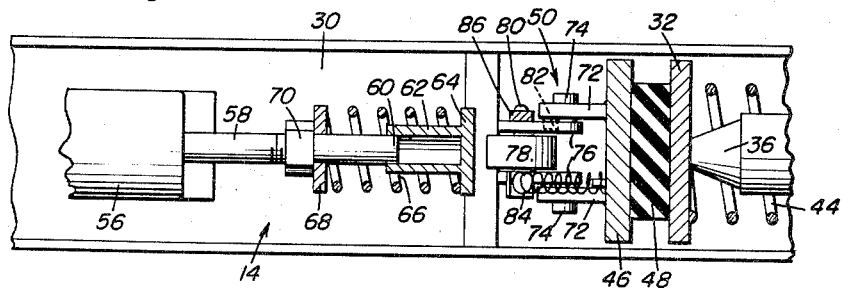
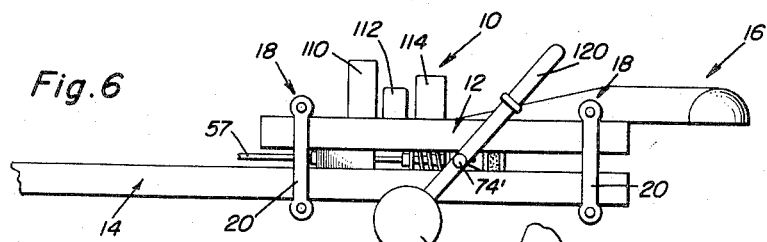
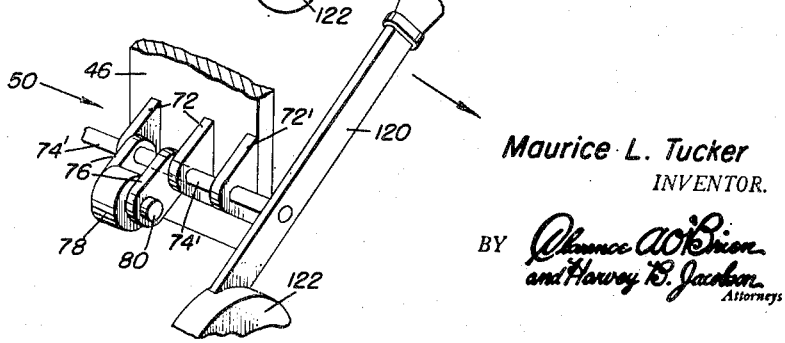

United States Patent Office 2,779,443
Patented Jan. 29, 1957.

2,779,443

AUTOMATIC BRAKING TRAILER HITCH

Maurice L. Tucker, Troy, Ohio, assignor of fifty percent to Douglas S. Wade, Detroit, Mich.

Application February 11, 1955, Serial No. 487,511

9 Claims. (Cl. 188—112)

This invention relates generally to means for coupling vehicles in trains, and particularly to coupling means of the character involving means for automatically applying the brakes of the trailing vehicle or vehicles when the trailing vehicle or vehicles crowd forwardly toward the leading or towing vehicle, so as to retard the trailing vehicle or vehicles. Said automatic braking tends to reduce the tendency of the vehicle to over-run a leading vehicle and to eliminate a major portion of the forward strain and thrust which is ordinarily exerted by the trailing vehicle or vehicles when the leading vehicle is slowed down when the vehicle train is descending a hill, for example.

With the increased usage of house trailers being drawn by passenger vehicles, there has arisen a growing necessity for a means to provide braking of the house trailer or trailing vehicle, with the braking being synchronized or coordinated with the tendency of the trailing vehicle to over-run the hauling vehicle.

Thus the primary object of this invention is to provide structure for use between the trailing and leading vehicles which includes automatic trailing vehicle brake applying means.

A further object of the invention is to provide a hitch structure as set forth in the object above wherein means are provided for rendering the automatic brake actuating means inactive.

Yet another object of the invention is to provide an automatic trailer braking structure with a hitch between a trailing and leading vehicle, a vehicle train including shock absorbing means and manually actuated means for rendering the automatic brake structure inactive.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a further enlarged sectional view of a portion of the novel hitch structure similar to that of Figure 2, showing the automatic brake structure in an inactive position, and further showing the wiring diagram which upon activation renders the automatic brake structure inactive;

Figure 5 is an enlarged sectional view taken substantially on line 5—5 of Figure 2;

Figure 6 is a side elevational view of the novel hitch structure on another scale showing the counterweighted manually actuatable lever for rendering the automatic brake structure inactive; and Figure 7 is an enlarged perspective view of a portion of the counterweighted manually actuated lever of Figure 6.

Figure 1:
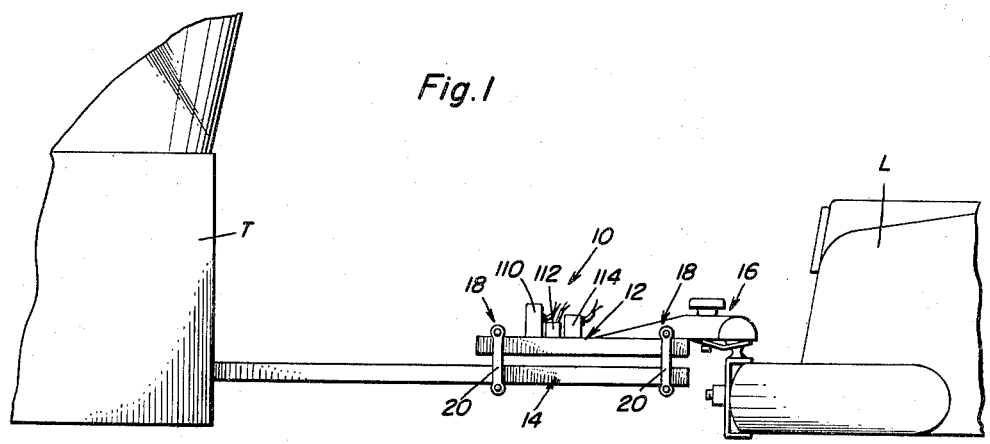
Figure 1 is a side elevational view showing the relative position of a trailing and leading vehicle in conjunction with the novel hitch structure.

The hitch is generally indicated at 10 and includes a pair of relatively movable upper and lower channel members 12 and 14, respectively. The upper channel member 12 is connected through a suitable detachable connecting means indicated generally at 16 to the rear of a leading vehicle L which is illustrated by way of example as a passenger vehicle, and the lower channel member 14 is secured to and movable with a trailing vehicle T illustrated in part as the forward portion of the house trailer.

The trailing vehicle will be equipped with wheel brake assemblies which are to be actuated by a master cylinder, however, there is no intent to limit the invention to any specific type of actuation of the wheel brake assemblies, i. e. they may be mechanically, hydraulically or electrically actuated wheel brakes, this invention merely disclosing a master cylinder structure which provides the force for actuating said wheel brake assemblies.

The channel members 12 and 14 are secured together by means of shackle members 18 which include pivotal side links 20 which permit the channel members in conjunction with said side members to assume the form substantially that of a parallelogram when relative longitudinal movement occurs between the upper and lower channel members. The upper channel member 12 includes a transverse top portion 22 which has secured at one end on the underside 24 thereof a downwardly extending support flange 26 secured thereon for example by welding. As viewed in Figure 2, the lower channel member 14 includes a transversely extending portion 28 which has secured to the underside 30 thereof an upwardly extending flange 32 which is substantially parallel to the downwardly extending flange 26. Interposed between the flanges 26 and 32 is a hydraulic shock-absorber 34 of any conventional type and which has one end 36 secured to the flange 32 in any suitable manner and the other end portion of which telescopes into another part of the shock-absorber, the end 38 of the other part abutting the vertical flange 26, being retained in abutting relationship by means of suitable retaining screws 40 which extend through the support flange 26 and are engageable with a flange portion 42 which is secured to the end 38 of the shock-absorber. Encircling the shock-absorber 34 and mounted thereon is a restraining compression spring 44 one end of which abuts the flange 32 and the other end of which engages the flange 42, the shock-absorber thus exerting force on the vertical flange 32. It will thus be observed that the compression spring 44 and shock-absorber 34 tend to restrain sudden rightward or forward movement of the channel member 14 which is integral and movable with the trailing vehicle. In addition, the spring 44 tends to urge the flange members 26 and 32 apart.

The underside 24 of the upper channel member 12 has secured thereto a second downwardly extending flange member 46 which is rearwardly disposed in relation to flange 26 and which has secured thereon a suitable resilient block portion 48 operable to contact the vertical flange 32 of the lower channel member 14. Secured to the side of the flange member 46 opposite the resilient block 48 is a cam assembly 50 which will subsequently be described in greater detail, however, for the purpose at this time it should be sufficient to say that this cam assembly 50 is operable to provide an abutment to provide means for actuating the trailing vehicle master cylinder which controls the braking of said trailing vehicle. An upwardly extending stop member 52 is suitably secured in longitudinally spaced relationship to the flange member 32 on the underside 30 of the lower channel member 14. It will be observed in Figure 4, when the upper channel member 12 is permitted to move rearwardly relative to the lower channel member, the lower portion 54 of the flange member 46 is operable to contact the stop member 52. The necessity for such contact will subsequently become more apparent during the description of the operation of this device.

Also connected to the underside 30 of the lower channel member 14 in any suitable manner is a master cylinder 56 of any conventional construction which includes a hydraulic line 57 which will be operably connected to the brake assemblies of the trailing vehicles (not shown) and which has extending therefrom a forwardly extending piston rod 58 which when urged to the left or toward the rear causes the pressure fluid to be urged out of the hydraulic fluid line 57.

The piston rod 58 includes on the forwardly extending end portion 60 thereof, as best seen in Figure 5, a telescopically engageable tubular element 62 which includes a cam engaging flange portion 64. Having one end in contact with one side of the flange 64 is a compression spring 66 which has its other end in engagement with an abutment washer 68 adjustably retained on the piston rod 58 by means of the nut 70. It should be observed that when force is applied on portion 64 the force is transmitted through the washer 68 to the piston rod 58 causing fluid to be urged from the master cylinder 56 through the hydraulic line 57. The spring 66 serves the purpose of cushioning sudden applications of force in the above-mentioned manner, and provides a smoother or cushioned application of the brakes of the trailing vehicle.

The previously mentioned cam assembly 50 includes a pair of rearwardly disposed support elements 72 having pivotally journaled therein stub shafts 74 which pivotally support cam roller support levers 76. Interposed between the cam roller support levers 76 is a cam roller element 78 rotatably carried by an axle 80 extending through the levers 76. The support elements 72 include on the lower portion thereof inwardly extending stop elements 82 for engagement with the pivotal support levers 76, said stop elements limiting excessive downward pivotal movement of the cam roller 78 and presenting it in the operative position disclosed in Figure 2. The pivotal cam support levers 76 and the cam roller 78 supported thereon are normally urged into an operative position by means of a suitable compression spring 84 interposed between one or both of the pivotal levers 76 and the underside 24, for example, of the channel member 12. Pivotally carried on the shaft 80 is a lever element 86 which is operatively connected to a cam disengaging assembly 88 which will be most clearly understood and which will be described most particularly with reference to Figure 4.

Extending downwardly at the underside 24 of the channel member 12 and rearwardly disposed relative to the cam assembly is a pivotal support bracket 90 which carries a lever element 92, the lever element 92 being pivoted on pin 94 and having one end secured to the lever 86 by means of the pivot pin 96 and having the other end pivotally secured to a solenoid actuated rod 98 by means of a pin 100. Secured between the pivot pin 94 and pivot pin 100 is an upwardly extending contact support rod 102 which is pivotally connected to the lever 92 by means of pivot pin 104. Pivotally supported on the lever 92 between the pivot pins 94 and 96 is a solenoid actuated rod 106 which is pivotally connected on the lever 92 by means of a pivot pin 108. The disengaging assembly includes in addition to the lever structure just mentioned, a roller cam resetting coil 110, a double-contact relay 112, a roller cam tripping coil 114, the suitable source of electric energy, such as a car or truck battery 116, and a double-throw normally opened operating switch 118.

In the event the towing vehicle does not include suitable wiring for accommodating electrically operated structure to be subsequently described, manual deactuating means is incorporated with the cam assembly, said structure being most clearly shown in Figures 6 and 7. The so-called disengagement of the cam roller is most generally necessary when it is desirable to back up the trailer wherein there is relative reciprocable movement between the upper and lower channel members, and wherein if the cam roller were not upwardly displaced as shown in Figure 4, the brakes would be applied through the contact of the cam roller with the flange 64 and thus prevent a backing up of the vehicle. The manually actuatable cam disengaging structure as seen in Figure 7 includes an additional bracket 72' which is substantially parallel to brackets 72 and which rotatably carries an outwardly extending shaft 74'. Shaft 74' is fixed to the cam roller support levers 76 so that cam roller 78 is displaced in response to oscillation of shaft 74'. The stub shaft 74' extends out from the side of the channel members and has removably secured thereon in any suitable manner the actuating handle 120 which includes at its lower portion a counterweight 122. Although the electrically operated solenoids and contact relay structure are shown in Figure 6, as previously explained, when the towing vehicle does not include the proper wiring the structure will not be utilized, and accordingly, this structure might be eliminated entirely utilizing only the manually actuated cam disengaging structure of Figure 7.

Figure 2:
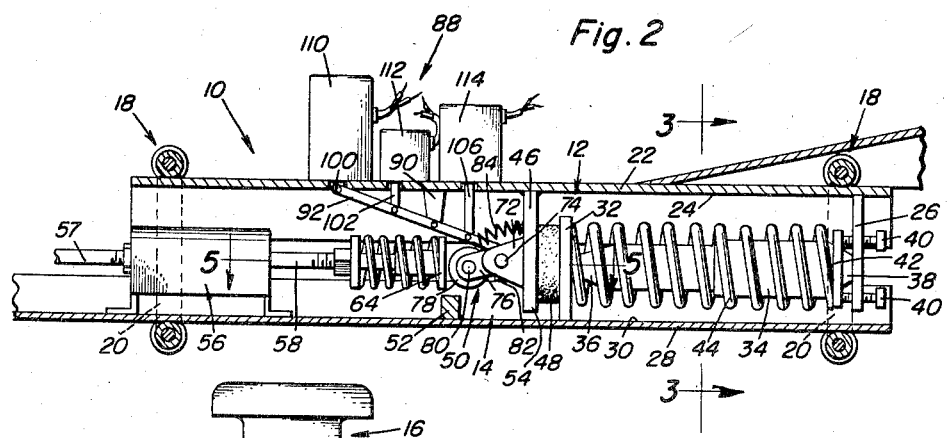
Figure 2 is an enlarged longitudinal sectional view of the novel hitch structure.
Figure 3:
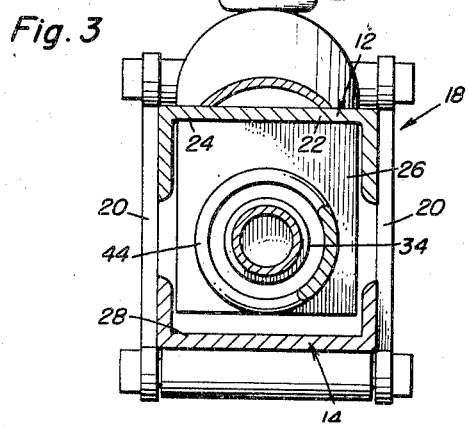
Figure 3 is a further enlarged sectional view taken substantially on line 3—3 of Figure 2.

The operation of the device is as follows:

During normal traveling conditions the hitch is secured between the leading and trailing vehicles as shown in Figure 1 and the parts are in the position shown in Figure 2. Upon deceleration the vehicle, or when the vehicle train is going down hill the rear or lower channel member 14 tends to over-run the upper channel member 12. With this tendency to over-run, the master cylinder 56 is carried forwardly with the channel member 14 and the cushion flange portion 64 is in contact with the cam roller 78 causing the exit of fluid to the hydraulic line 57 to the brake assemblies on the trailing vehicle. It will be noted that when the channel member 14 is forward or toward the right as viewed in Figure 2 the resilient block 48 provides a cushion between the flanges 32 and 54. Sudden movement between the channels 12 and 14 is prevented by the shock assembly 34 and the spring 44 which are operably engageable between the flanges 32 and 26 mounted on the channel members 14 and 12, respectively.

When the deceleration of the leading vehicle ceases, the spring 44 is effective to urge the brake actuating parts of the hitch assembly back to an inoperative condition. Thus, it is readily apparent that the hitch assembly provides automatic braking of the rear or trailing vehicle.

When it is necessary to back up the vehicle train the cam roller 78 is moved upward to a position shown in Figure 4 wherein contact between the roller 78 and the flange portion 64 operatively associated with the master cylinder is prevented. This upward movement of the cam roller is accomplished by moving the double-throw switch 118 into the position shown in Figure 4 wherein current flows through the solenoid coil 114 drawing the rod portion 106 upwardly causing upward movement of the end lever 92 to which the rod 106 is secured, the pivotal movement being around pivot pin 94. The opposite end portion of the lever 92 which pivotally carries the contact carrying rod 102 and the solenoid rod 98 are pulled into a downward position, wherein the lower contact of the contact assembly 112 completes a circuit which will permit current to flow through the solenoid 110 when the double-throw switch is thrown in the opposite direction shown in Figure 4.

In the embodiment shown in Figures 6 and 7 deceleration of the towing vehicle causes the counterweight 122 to swing forward due to the force of inertia wherein the cam 78 is urged into an operable position. In backing up of a vehicle which includes manually actuated handle 120 it should be readily apparent wherein said handle is rotated in the direction indicated by the arrow in Figure 7, the cam roller 78 is moved out of operative position, permitting the vehicle train to be backed up without the actuation of the brakes on the trailing vehicle.

Various terms such as "front," "rear," "right" or "left" or any other positional directional terms are intended to have only a relative connotation to aid in describing the device and are not intended to be interpreted as requiring any particular orientation with respect to any external elements.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A hitch comprising a first member adapted to be connected to a source of draft power, a second member adapted to be connected to an object to be drawn, means connecting said members in overlying relationship and permitting relative longitudinal movement between said members, abutment means carried by one of said members, and force transmitting means carried by said other member, said force transmitting means being operative to contact said abutment means during relative movement of said overlying members, said abutment means including a pivotal cam for contacting said force transmitting means, manually operable means connected to said pivotal cam for urging it out of contact with said force transmitting means during relative movement between said first and second members, means including a lever for pivotally supporting said cam, said manually operable means comprising a plurality of electrically actuated solenoids, a two-position switch and a relay, lever means connected to said pivotal cam and operably associated with said electrically actuated solenoids and relay wherein pivotal movement of said cam is controlled by the two-position switch.

2. In a hitch as set forth in claim 1 wherein said force transmitting means includes a master cylinder having a piston rod extending therefrom operable to engage said abutment means upon relative movement of the first and second members.

3. In a hitch as set forth in claim 2 wherein said piston rod includes relatively telescoping elements having interposed therebetween a compression spring for preventing sudden actuation of the master cylinder.

4. A hitch comprising a first member adapted to be connected to a source of draft power, a second member adapted to be connected to a trailing vehicle which has brake assemblies thereon, means connecting said members in overlying relationship and permitting relative longitudinal movement between said members, abutment means carried by one of said members, force transmitting means carried by said other member and operative to contact said abutment means during relative movement between said members for actuating the brake assemblies on said trailing vehicle, said force transmitting means including a master cylinder having a piston rod extending therefrom which is operative to contact said abutment means, resilient shock absorbing means between said abutment means and said piston rod, a shock-absorbing assembly carried by the member carrying said abutment means to prevent sudden relative movement between said first and second members and including a flange member mounted on each of said first and second members, said flange members having interposed therebetween a compression spring and a shock absorber, a cushion interposed between said abutment means and one of said flange members.

5. In a hitch as set forth in claim 4 wherein said abutment means includes a pivotal cam member resiliently urged into a position to contact the piston rod of said master cylinder due to relative movement between said first and second members.

6. A hitch as set forth in claim 4 wherein lever means are pivotally carried by said pivotal cam member and are operatively connected to manually operable means for moving said pivotal cam element out of operative contact with said piston rod.

7. A hitch assembly as set forth in claim 6 wherein said manually operable means includes a plurality of electrically actuated solenoids and a relay assembly operably connected to the lever means pivotally engaged with said pivotal cam member, and further including a two position switch for actuating said solenoid means.

8. In a hitch as set forth in claim 6 wherein said manually actuated means includes a counter-weighted lever extending by the side of said first and second members, said counter-weighted lever tending to urge the pivotal cam member into position to be contacted by the piston rod of said master cylinder upon relative movement between said first and second members.

9. A trailer hitch comprising a first member adapted to be connected to a source of draft power, a second member adapted to be connected to an object to be drawn, means connecting said members together so that they are capable of relative longitudinal movement, an abutment carried by one of said members, a master cylinder, an actuating rod extending from said master cylinder, yielding means at the end of said master cylinder actuating rod with which to actuate said rod, said abutment including a pivotal element which is adapted to come into contact with the yielding means at the end of said master cylinder actuating rod in order to actuate the master cylinder in response to relative longitudinal motion between said first and second members, a shock absorber arranged between said first and second members for actuation in response to said relative movement, and means operatively connected with said pivoted element for imparting movement thereto.

References Cited in the file of this patent

UNITED STATES PATENTS

| 2,144,401 | Buckellew | Jan. 17, 1939 |
| 2,211,025 | Parkes | Aug. 13, 1940 |
| 2,522,855 | Brown | Sept. 19, 1950 |
| 2,562,280 | Mayhew | July 31, 1951 |
| 2,625,243 | Jones | Jan. 13, 1953 |
| 2,630,888 | Fikse | Mar. 10, 1953 |
| 2,662,616 | De Lateur | Dec. 15, 1953 |

FOREIGN PATENTS

| 585,287 | France | Dec. 6, 1924 |